United States Patent [19]
Tomko et al.

[11] Patent Number: 6,051,633
[45] Date of Patent: *Apr. 18, 2000

[54] NON-AQUEOUS DISPERSIONS

[75] Inventors: Richard F. Tomko, North Olmsted; Madhukar Rao, Brecksville, both of Ohio; Mohamad D. Shalati, Homewood; John D. Kraan, Hometown, both of Ill.

[73] Assignee: The Sherwin-Williams Company, Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/977,693

[22] Filed: Nov. 25, 1997

Related U.S. Application Data

[63] Continuation of application No. 08/730,767, Oct. 16, 1996, abandoned, which is a continuation of application No. 08/484,375, Jun. 7, 1995, abandoned, which is a continuation of application No. 08/292,551, Aug. 18, 1994, abandoned, which is a continuation of application No. 07/649,395, Jan. 7, 1991, abandoned.

[51] Int. Cl.[7] .................................................. C08L 67/08
[52] U.S. Cl. .......................... 523/507; 523/437; 523/500; 523/523; 524/513; 524/539
[58] Field of Search ...................... 524/513, 539; 523/437, 500, 507, 523

[56] References Cited

U.S. PATENT DOCUMENTS

| | | | |
|---|---|---|---|
| 3,257,341 | 6/1966 | Osmond | 524/392 |
| 3,833,384 | 9/1974 | Noonan et al. | 522/121 |
| 3,926,875 | 12/1975 | Tsugukuni et al. | 528/45 |
| 3,933,703 | 1/1976 | Di Giacomo | 524/562 |
| 4,116,903 | 9/1978 | Lietz et al. | 523/501 |
| 4,388,427 | 6/1983 | Nishikawa et al. | 523/500 |
| 4,525,499 | 6/1985 | Hayashi et al. | 524/461 |
| 4,960,828 | 10/1990 | Higuchi et al. | 525/443 |
| 4,983,716 | 1/1991 | Rao et al. | 523/500 |
| 4,997,480 | 3/1991 | Rao | 524/313 |

FOREIGN PATENT DOCUMENTS

| | | | |
|---|---|---|---|
| 0086845 | 7/1980 | Japan | 523/500 |

*Primary Examiner*—Andrew E. C. Merriman
*Attorney, Agent, or Firm*—Vivien Y. Tsang; Robert E. McDonald

[57] ABSTRACT

This invention relates to high solids, low VOC, low viscosity, filterable, non-gritty non-aqueous dispersions, and coating compositions containing said non-aqueous dispersions.

12 Claims, No Drawings

NON-AQUEOUS DISPERSIONS

This application is a continuation of application Ser. No. 08/730,767 filed Oct. 16, 1996, now abandoned; which in turn was a Continuation of application Ser. No. 08/484,375, filed Jun. 7, 1995, now abandoned; which in turn, was a Continuation of application Ser. No. 08/292,551, filed Aug. 18, 1994, now abandoned; which in turn, was a Continuation of application Ser. No. 07/649,395, filed Jan. 7, 1991, now abandoned.

BACKGROUND OF THE INVENTION

Non-aqueous dispersions (RAD's) are well known in the art and typically consist of dispersions of addition polymers in a relatively non-polar non-aqueous liquid containing a steric stabilizing agent having dual affinity to both the dispersing and the dispersed media. For example, U.S. Pat. No. 3,198,759 teaches dispersions of addition polymers in a hydrocarbon medium. The hydrocarbon medium contains one or more aliphatic hydrocarbons containing dissolved therein an alkyd formed by either the direct esterification of a drying oil fatty acid with a dicarboxylic acid and a polyhydric alcohol or the indirect esterification of a drying oil by first alcoholization with a polyhydric alcohol and second esterification with a polybasic acid. European Patent Application 0 310 331 A2 teaches a non-aqueous dispersion of a soluble low molecular weight non-alkyd polymer which is attached or adsorbed onto a second non-soluble alkyd-free polymer. U.S. Pat. No. 4,530,957 teaches non-aqueous dispersions based on crosslinked acrylic polymer particles dispersed in a non-aqueous medium having a polymeric dispersion stabilizer. The polymeric dispersion stabilizer can be an alkyd which is formed by the self condensation of 12-hydroxystearic acid followed by a capping reaction with glycidyl methacrylate. U.S. Pat. No. 4,206,099 teaches non-aqueous dispersions of crosslinked polymer particles in a non-aqueous medium having an amphipathic steric stabilizing agent. The steric stabilizing agent can be a graft copolymer obtained by reacting a low molecular weight carboxyl group terminated condensate of linseed oil fatty acids and 12-hydroxystearic acid with acrylic copolymers. U.S. Pat. No. 3,779,977 teaches non-aqueous dispersions of an acrylonitrile copolymer in a liquid butadiene homopolymer or copolymer in a non-polar organic hydrocarbon liquid.

A review of those patents clearly shows that most NAD's have solids contents in a range generally less than 60% by weight and have relatively high volatile organic contents. Attempts to raise the solids content and lower the volatile organic content of these NAD's has led to compositions which either gell unacceptably, exhibit extremely high viscosities, are not stable for any appreciable length of time or exhibit extremely long and unacceptable dry times as air dry coatings.

In our attempts to decrease the VOC contents of NAD's, we have found that many alkyds produced via the traditional "alcoholysis" process (alcoholysis of a drying oil followed by reaction with a polybasic acid) have extremely high viscosities. The use of such alkyds in a non-aqueous dispersion can force the formulator to use a large amount of solvent to lower viscosity. This in turn causes the VOC of the NAD to increase unacceptably. Additionally, we have found that while many alkyds produced via the traditional "fatty acid esterification" process can be used to produce stable NAD's, they typically are limited in their ability to produce NAD's or coatings having NVM's greater than about 70% and VOC's less than about 350 g/l.

The present invention produces very high solids NAD's, greater than about 75% NVM, with very low VOC's of less than 305 g/l, which exhibit excellent stability, filterability, low grit, viscosity and tack-free and dry times when formulated as air dry coating compositions. These NAD's are the result of a selection process wherein certain critical parameters, described fully below, must be observed.

SUMMARY OF THE INVENTION

This invention relates to novel, high solids, low VOC non-aqueous dispersions (NAD's) and a process for producing these non-aqueous dispersions. The NAD's of this invention comprise an alkyd as the dispersing medium and steric stabilizer for the polymerization product of one or more monomers which are predominantly non-soluble in the alkyd medium. The NAD's of this invention are the product of a process which requires, in addition to other factors, at least one alkyd stabilizer, which stabilizer has a z-average molecular weight between about 10,000 and 250,000, preferably between about 15,000 and 150,000; and which stabilizer has a polydispersity between about 2.0 and 20, preferably between about 2.0 and 6.0. The use of this alkyd as the dispersing medium for the polymerization of free radical addition monomers, one of which is hydroxy-functional, further in the presence of a chain transfer agent, yields NAD's having non-volatile materials (NVM) contents greater than about 754 by weight, typically approaching 100% NVM, having volatile organic contents (VOC) typically less than about 305 g/l, preferably less than about 250 g/l, which NAD's exhibit excellent dry times not heretofore associated with very high solids alkyds or NAD's. The NAD's of this invention are particularly suited for interior and exterior applications in the architectural, industrial maintenance, and traffic paint and coatings industries.

The process for producing the NAD's of this invention comprises using an alkyd meeting the criteria established herein as the dispersing medium, either alone or in combination with some minor amount of hydrocarbon, aromatic, polar, ketone, ester, or alcohol solvent, or in combination with other minor amounts of other alkyd, modified-alkyd, or hydrocarbon dispersing media, for the polymerization of monomers which are predominantly insoluble in the alkyd medium. The particular means for the production of the alkyd are not of import to this invention. Thus, the alkyd can be produced according to any of the traditional processes for the production of alkyds which are readily available from the art or the alkyd can be produced according to the teachings of pending patent application Ser. No. 464,841 filed Jan. 16, 1990, incorporated by reference herein. Critical to the success of this invention is that the alkyds used must have z-average molecular weights between about 10,000 and about 250,000, preferably between about 15,000 and 150,000; with a polydispersity between about 2.0 and 20, preferably between about 2.0 and about 6.0. Preferably, the alkyd stabilizer has an NVM solids content of at least about 75% more preferably at least about 90%.

The alkyd serves as the dispersing medium and steric stabilizer for the reaction of free radical addition monomers which produce a polymer which is predominantly insoluble in the alkyd medium. The monomers are polymerized in the presence of the alkyd to produce the novel NAD's of this invention. Another critical parameter which must be followed is that at least one monomer must have hydroxy-functionality. A third critical parameter which rust be followed is that the polymerization must take place in the presence of a chain transfer agent.

We have found that by following these key critical parameters, one can formulate an NAD having an NVM greater than about 70%, which is stable, non-gritty, filterable, and low in viscosity. We have found that failure to follow these key critical parameters results in NAD's which are not stable, have very poor yields, do not filter properly and/or are unacceptably high in viscosity.

Accordingly, it is an object of this invention to teach novel non-aqueous dispersions.

It is another object of this invention to teach a high solids, low VOC, non-aqueous dispersion having acceptable air dry times.

It is a further object of this invention to teach a process for producing high solids, low VOC non-aqueous dispersions having acceptable air dry times.

DETAILED DESCRIPTION OF THE INVENTION

As stated above, the process for producing the NAD's of this invention comprises selecting an alkyd having a z-average molecular weight between about 10,000 and about 250,000, preferably between about 15,000 and 150,000, with a polydispersity between about 2.0 and about 20, preferably between about 2.0 and about 6.0; and using this alkyd as the dispersing medium, either alone or in combination with some minor amount of solvent or other dispersing media, for the polymerization of monomers which are predominantly insoluble in the alkyd medium. The alkyd used in these NAD's is formed by any of the traditional processes such as fatty acid esterification or alcoholysis of a drying oil with later reaction with a di- or tri- basic acid, or the alkyd can be formed according to the teaching of U.S. patent application Ser. No. 464,841 filed Jan. 16, 1990.

The alkyds of this invention must have a z-average molecular weight between about 10,000 and 250,000, preferably between about 15,000 and 150,000; with a polydispersity between about 2.0 and about 20, preferably between about 2.0 and about 6.0. Alkyds in this range provide the basis for a high solids, low VOC composition.

Typical raw materials for the formation of alkyds include triglyceride oils or the fatty acids thereof. These can be selected from the group consisting of linseed oil, soya oil, coconut oil, cottonseed oil, peanut oil, canola oil, corn oil, safflower oil, sunflower oil, dehydrated castor oil, fish oil, perilla, lard, walnut oil, tung oil, tall oil, the fatty acids thereof and mixtures thereof. Particularly preferred are those oils and acids containing unsaturation in the glyceride chains. Particularly preferred are soya oil, dehydrated castor oil and linseed oil and the fatty acids thereof.

Multi-functional alcohols, and mixtures thereof, are also common raw materials for the production of alkyds. One suitable hexafunctional alcohol includes dipentaerythritol. One suitable tetrafunctional alcohol includes pentaerythritol. Suitable trifunctional alcohols include the group consisting of trimethylol propane, trimethylol ethane, glycerine, tris hydroxyethyl isocyanurate, and mixtures thereof, either alone or in combination with a difunctional alcohol selected from the group consisting of ethylene glycol, propylene glycol, cyclohexane dimethanol, and mixtures thereof. Additionally, dimethylol propionic acid can be used in combination with the trifunctional alcohol. Multi-functional alcohols, trifunctional alcohols, and mixtures thereof are particularly preferred due to the degree of branching they allow. Difunctional alcohols, if used, are preferably used as a minor component in combination with trifunctional alcohols. A portion of monofunctional alcohol, or monobasic acid such as soya fatty acid, linseed oil fatty acid or crotonic acid, up to about 20% by weight of the total alkyd can be added with the multifunctional alcohol to control molecular weight and act as a chain stopper.

Another typical raw material used in the formation of alkyds is multi-functional carboxylic acids or anhydrides. Suitable trifunctional carboxylic acids include trimelletic acid, trimesic acid, 1,3,5-pentane tricarboxylic acid, citric acid and others whereas suitable trifunctional anhydrides include trimelletic anhydride, pyromelletic anhydride and others. Difunctional carboxylic acids include phthalic acid, isophthalic acid, terephthalic acid, maleic acid and fumaric acid and mixtures thereof. Mixtures of such acids and anhydrides are also acceptable.

The amounts of oil, acid and alcohol used should be such that the resulting alkyd has a high degree of branching, a z-average molecular weight, $M_z$, between about 10,000 and 250,000, preferably between about 15,000 and 150,000, a polydispersity between about 2.0 and about 20, preferably between about 2.0 and about 6.0, an oil length of between about 65% and 85%, an acid value less than about 20, and a hydroxyl number less than 100, preferably less than 60. The NVM should be above about 70%, preferably up to about 100%.

If desired, a reaction catalyst such as lithium hydroxide monohydrate, barium hydroxide, or di-butyl tin oxide can be added in an amount of approximately 0.02% by weight of oil.

Alkyds having Mz between about 10,000 and about 250,000 are especially suitable for use in the non-aqueous dispersions of this invention as the dispersing medium and to disperse and stabilize insoluble monomers and polymers. The NAD's made according to this invention typically have NVM's of about 75% or more, preferably up to about 100% NVM, have Brookfield LVT #3 (6/12 rpm) viscosities less than about 60,000 cps at 25 degrees C, preferably less than about 30,000 cps, more preferably less than about 10,000 cps, have volatile organic contents less than 305 g/l, preferably less than 250 g/l, and exhibit excellent air dry times using conventional drier compounds.

Two particularly suitable commercially available alkyds which exhibit the requisite Mz values and thus are suitable for use in this invention include the 98% solids, long oil alkyd marketed by Cargill, Inc. under the designation 57-5843 (Mz of approximately 45,000 and polydispersity of about 5.6) ; and the 100% solids isophthalic alkyd oil marketed by McCloskey under the designation Varkydol® 210-100 (Mz of approximately 18,000 and polydispersity of about 2.7).

When preparing non-aqueous dispersions according to this invention, the monomers should be selected from monomers which would produce a polymer via the free radical addition reaction mechanism which is predominantly insoluble in the alkyd medium. It is essential that at least one of the monomers contain hydroxy functionality. More preferably, between about 5% and 35% by weight of the total reactor charge comprises hydroxy functional monomers. Most preferably, between about 10% and about 30% by weight of the total reactor charge comprises a hydroxy functional monomer such as hydroxy ethyl acrylate. Suitable monomers can be selected from the group consisting of acrylonitrile, methacrylonitrile, hydroxy ethyl acrylate and methacrylate, hydroxy propyl acrylate and methacrylate, methyl acrylate and methacrylate, ethyl acrylate and methacrylate, butyl acrylate and methacrylate, lauryl acrylate and methacrylate, and the like, trimethylol propane triacrylate and trimethacrylate, hexanediol diacrylate, Tone M-100 (caprolactone modified hydroxy ethyl acrylate), polyethylene oxide acrylate and methacrylate, polypropylene oxide acrylate and methacrylate, allyl alcohol, acrylamide, methacrylamide, vinyl chloride, vinylidene chloride, and mixtures thereof. In addition to pure monomers, preformed polymers, polymeric intermediates, multifunctional epoxideg, melamines and isocyanates, can be included in the reactor charge. Most preferred is a combination of methyl methacrylate and hydroxy ethyl acrylate wherein the methyl methacrylate is present in an amount of between about 20 and 40%, and the hydroxy ethyl acrylate is present in an amount of between about 10 and 30%, by weight of total reactor charge.

Certain monomers should not be included in the reactor charge due to their effect on the viscosity of the NAD or the grittiness of the NAD. These include acrylic acid, methacrylic acid, and itaconic acid as the inclusion of such acids tends to create a gritty NAD. Also included is styrene because of an unacceptable resultant increase in NAD viscosity. Also included are divinyl benzene, vinyl napthalene, and vinyl toluene because these are generally soluble in alkyds. These monomers have been found to contribute to a decrease in yield, additional grit, and/or a lessening of stability over time.

To prepare the NAD's of this invention, the alkyd dispersing medium is used as the polymerization medium for the monomer charge. The alkyd medium can be diluted with mineral spirits or other solvent if desired, with the primary limitation being concern for the VOC of the composition.

The total amount of alkyd contained in the reaction vessel, including any alkyd which may be added with the monomer charge, should comprise between about 25% to about 75%, preferably from about 40% to about 60%, by weight of the total reactor charge. The free radical addition monomer charge should, after completely added to the reaction vessel, account for approximately 75% to about 25%, preferably between about 60% to about 40%, by weight of the total reactor charge. The total reactor charge is defined as the total combined weight of the alkyd and monomer. A mercaptan-containing chain transfer agent such as methyl mercaptopropionate, dodecyl mercaptan, thioglycolic acid, or 2-mercapto ethanol must also be added to the vessel in an amount from about 0.1% to about 6.0% by weight of total reactor charge. Most preferred is 2 mercapto ethanol. An initiator selected from the group consisting of organic peroxides such as benzoyl peroxide, lauroyl peroxide, di-t-butyl peroxide, acetyl peroxide, t-butyl peroctoate, t-amyl peroctoate, and t-butyl perbenzoate, and selected from the group consisting of nitrile initiators such as a,a'-azobisisobutyronitrile, and mixtures thereof are also added in an amount up to about 3% by weight of the total monomer charge.

All free radical addition reactants are preferably added via dropwise addition over a period of time to the alkyd dispersing medium. The monomer charge can be added pure, or, in a preferred embodiment, the monomers can be dispersed in an amount of the alkyd of this invention prior to addition to the dispersing medium. The amount of alkyd used for such a dispersion should be included in the calculation of the overall amount of alkyd present in the reaction vessel. Any additional ingredients such as acrylic polymers and copolymers, macromonomers, silicones, XI-100™ from Monsanto (poly allyl glycidyl ether), alkyds, uralkyds, urethane-modified oils, polyesters, and epoxy esters can be included in the reactor charge provided they are solubilized in either the monomer charge or the alkyd dispersing media.

The temperature of the contents of the reaction vessel should be maintained between about 200° F. and 250° F. for the entire period that monomer charge is being added. A nitrogen blanket is also highly preferred. Upon completion of the monomer addition, an activator selected from the group consisting of the iron, copper, vanadium, cobalt and manganese naphthenates, octoates, hexanates and isodecanoates is added to the reactor vessel and a hydroperoxide chaser composition selected from the group consisting of cumene hydroperoxide, t-butyl hydroperoxide, t-amyl hydroperoxide, and the like is added dropwise over a period of about 90 minutes. Upon completion of the chase, the temperature should be maintained between 200° F. and 250° F. for approximately one hour. At the end of that hour, the heat is removed and the contents of the vessel are filtered.

The non-aqueous dispersions of this invention can be used alone as coating compositions. Or, they can be used in combination with other high or low VOC alkyds to reduce the overall VOC of a coating. They can be combined with other film-forming compositions such as acrylic polymers and copolymers polybutadiene, and polyallyl glycidyl ether. They can be formulated with other readily available, standard paint ingredients and components such as crosslinking agents, catalysts, rheology modifiers, thixotropes, extenders, colors and pigments, solvents, anti-skinning agents, drying agents, dispersants and surfactants, fungicides, mildewcides, preservatives, UV absorbers, anti-marring agents, anti-cratering agents, flow and leveling agents, fragrances, defoaming agents, chelating agents, flattening agents, and anti-rusting agents.

Suitable rheology modifiers are well known in the art and can comprise organoclays, fumed silica, dehydrated castor oil organic derivatives (exemplary tradenames: Thixatrol (R), NL Industries; Flowtone (R), English China Clay), polyamides, polyamide modified alkyds, MPSA-60, Rheox, alkylbenzene sulphonate derivatives, aluminum, calcium and zinc stearates, calcium soyate, and the like.

Suitable extenders are also well known in the art and can comprise amorphous, diatomaceous, fumed, quartz and crystalline silica, clays, aluminum silicates, magnesium aluminum silicates, talc, mica, delaminated clays, calcium carbonates and silicates, gypsum, barium sulfate, zinc, calcium zinc molybdates, zinc oxide, phosphosilicates and borosilicates of calcium, barium and strontium, barium metaborate monohydrate, and the like.

Suitable colors and pigments are well known in the art and can comprise for example, titanium dioxide, carbon black, graphite, ceramic black, antimony sulfide, black iron oxide, aluminum pastes, yellow iron oxide, red iron oxide, iron blue, phthalo blue, nickel titanate, dianisidine orange, dinitroaniline orange, imidazole orange, quinacridone red, violet and magenta, toluidine red, molybdate orange, and the like.

Suitable solvents can comprise propylene and ethylene glycol ethers and acetates, alcohols, ketones, aliphatic and aromatic hydrocarbons and naphthas, petroleum and wood distillates, turpentine, pine oil, and the like. Solvent selection is limited primarily by the desire to maintain the overall VOC level of the coating composition below 305 g/l, preferably below 250 g/l.

Anti-skinning agents such as methyl ethyl ketoxime, o-cresol, and hydroquinone can be included.

Drying agents can comprise standard metallic and rare earth driers such as cobalt, calcium, potassium, barium, zinc, manganese, tin, aluminum, zirconium and vanadium napthenates, octoates, hexanates, and isodecanoates. A particularly preferred drier composition is a combination of cobalt, calcium and zirconium driers present in an amount from about 0.1% to about 2.5% by weight of the coating composition.

Suitable dispersants and surfactants can comprise any of the readily available dispersants and surfactants to the coatings industry, including the anionic and nonionic surfactants, soya lecithin, alkyl ammonium salts of fatty acids, amine salts of alkyl aryl sulfonates, unsaturated organic acids, sulfonated castor oil, mixtures of high boiling point aromatic and ester solvents, sodium salts of aryl sulfonic acid, Solsperse™ from ICI, and the like.

The following examples will demonstrate various embodiments of this invention.

EXAMPLE ONE

Preparation of Alkyd with Mz of about 13,973

Charge 1819 g of soya fatty acid, 496 g of pentaerythritol, 0.36 g of dibutyltin catalyst and 32 g of xylene to a reactor equipped with inert gas, mechanical stirrer, barrett tube and Friedrich's condenser. Heat to 370 degrees F and hold for one hour. Cool to 360 degrees F and add 283 g of crotonic acid, 400 g isophthalic acid, 186 g RJ-101 (a styrene-allyl alcohol copolymer available from Monsanto) and 32 g xylene. Heat to 485 degrees F and hold for a viscosity of Z4 (maximum) and an acid value <20 at 97.5% NVM. Cool. The resultant alkyd has an NVM of 98.2, a viscosity of Z3, an acid value of about 16, Hz of about 13,973, Mw of about 5582, Mn of about 2113 and a polydispersity of about 2.64.

EXAMPLE TWO

Preparation of Alkyd with Mz of about 47,400

Charge 1808 g of soya fatty acid, 493 g of pentaerythritol and 0.36 g of a dibutyltin catalyst to a 5l, 4-necked round bottom flask equipped with inert gas, mechanical stirrer, barrett tube and Friedricks condenser. Heat to 370 degrees F and hold for one hour. Add 280.96 g of crotonic acid, 433.92 g of isophthalic acid and 115.2 g of RJ-101. Heat to about 478 degrees F and hold for a viscosity of Z-Z2 at 90% NVM in mineral spirits and an acid value <14. Cool to room temperature and reduce to 90% NVM in mineral spirits. The resultant alkyd has 90% NVM, viscosity of about Z1, acid value of about 13.5, color of 6–7, Mz of about 47,404, Mw of about 13,869, Mn of about 3,044 and a polydispersity of about 4.56.

EXAMPLE THREE

Preparation of Alkyd with Mz of about 28,200

Charge 1354.7 grams of soya oil and 243.3 grams of trimelletic anhydride to a 3 liter, 4-necked, round bottom flask equipped with inert gas blanket and mechanical stirrer. Heat the contents to about 480° F. and hold for about one-half hour. Cool to about 400° F. and add 255.3 grams of trimethylol propane, 25.6 grams of trimethylol ethane and 408.2 grams of linseed fatty acid. Heat to 480° F. and hold for an Acid Value less than or equal to 13 and a viscosity of W.

The resulting alkyd has an NVM of about 100%, a Gardner-Holdt viscosity of about W, an Acid Value of about 9.7, an $M_z$ of about 28,200, an oil length of about 80 and a Hydroxyl No. of about 37.

EXAMPLE FOUR

Preparation of Alkyd with Mz of about 23,639

Charge 1996.3 g of soya fatty acid, 760.5 g of dipentaerythritol and 0.41 g of dibutyltin catalyst to a 5l, 4-necked reactor equipped with inert gas, mechanical stirrer, barrett tube and Friedrich's condenser. Heat to 370 degrees F and hold for one hour. Add 335.6 g of crotonic acid, 321.6 g of isophthalic acid and 85.76 g of xylene. Heat to 480 degrees F and hold for a viscosity of Z4 (maximum) and an acid value <13 at 100% NVM. The resultant alkyd has an NVM of about 99.0%, a viscosity of about Z4, an acid value of about 11, Hz of about 23,639, Mw of about 8,432, Mn of about 2829 and a polydispersity of about 2.98.

COMPARATIVE EXAMPLE ONE

Alkyd with Mz of about 9,700

Charge 1861.3 g soya fatty acid, 507.1 g pentaerythritol and 0.37 g of dibutyltin catalyst to a 5l, 4-necked reactor equipped with inert gas, mechanical stirrer, barrett tube and Friedrich's condenser. Heat to 370 degrees F and hold for one hour. Add 189.8 g RJ-101, 289.1 g crotonic acid, 294.7 g isophthalic acid and 58 g of xylene. Heat to 485 degrees F and hold for a viscosity of Y-Z1 and an acid value <14 at 97.5% NVM. The resultant alkyd has an NVM of about 98.25%, a viscosity of Y-Z, an acid value of about 10.8, colour of about 4, Mz of about 9,716, Mw of about 3,927, Mn of about 1894, and a polydispersity of about 2.07.

PREPARATION OF NADS

Four categories of NAD's were prepared from each of the above alkyds as well as from the Cargill 57-5843 alkyd and the McCloskey Varkydol®210-100 alkyd. The NAD categories had the following approximate compositions by weight:

| NAD "A" | 50 parts alkyd |
| | 35 parts methyl methacrylate |
| | 15 parts hydroxy ethyl acrylate |
| | 0.2 parts chain transfer agent |
| NAD "B" | 50 parts alkyd |
| | 50 parts methyl methacrylate |
| | 0 parts OH-functional monomer |
| | 0.2 parts chain transfer agent |
| NAD "C" | 50 parts alkyd |
| | 35 parts methyl methacrylate |
| | 15 parts hydroxy ethyl acrylate |
| | 0 parts chain transfer agent |
| NAD "D" | 50 parts alkyd |
| | 50 parts methyl methacrylate |
| | 0 parts OH-functional monomer |
| | 0 parts chain transfer agent |

The following procedure was used to make each NAD:

Charge about ½ of the alkyd to a reactor equipped with a mechanical stirrer. Heat to 100° C. Disperse the monomer/chain transfer agent solution in the remainder of the alkyd and begin a three hour dropwise addition of the solution along with a initiator solution comprising t-butyl peroctoate in mineral spirits to the reactor. Upon completion of the addition of the solutions, hold for approximately one hour and then add vanadium naphthenate to the reactor. Begin a 90 minute addition of a "chase" comprising mineral spirits and cumene hydroperoxide. Hold the temperature at 100° C. for approximately ½ to 1 hour after the chase has been completely added. Shut off heat and filter the contents of the reactor through a 15 micron polyester filter bag.

Table I demonstrates the properties of each NAD:

| Alkyd/CTA | NAD "A" | NAD "B" | NAD "C" | NAD "D" |
|---|---|---|---|---|
| Ex. I 2-Me* | NVM 83% 6/12 rpm 3750/3875 cps **Hegman: 8 | NVM 82.2% FILTER CLOG Hegman: 0 | SCRAP | SCRAP |
| Ex. II DM* | NVM 85.4% 6 rpm 57000 cps Hegman: 1 | SCRAP | SCRAP | SCRAP |
| Ex. III 2-Me | NVM 86.8% 6/12 rpm 2100/2150 cps Hegman: 8 | SCRAP | SCRAP | SCRAP |
| Ex. IV 2-Me | NVM 82.1% 6/12 rpm 8800/9000 cps Hegman: 8 | SCRAP | SCRAP | SCRAP |
| Cargill 5843 DM | NVM 83% 6/12 rpm 5900/5200 cps Hegman: 5 | NVM 78.1% FILTER CLOG Hegman: 1 | NVM 82.2% FILTER CLOG Hegman: 1 | SCRAP |
| Cargill 5843 2-Me | NVM 82.4% 6/12 rpm 1850/1850 cps Hegman: 5 | NVM 81.4% FILTER CLOG | SCRAP | SCRAP |
| McCloskey 2-Me | NVM 82.2% 6/12 rpm 860/860 cps Hegman: 8 | NVM 86.3% FILTER CLOG | SCRAP | SCRAP |
| McCloskey 2-Me | NVM 97.8% 6/12 rpm 24,600 cps Hegman: 8 | NVM 95.9% FILTER CLOG | SCRAP | SCRAP |
| Comp. Ex. I 2-Me | SCRAP | SCRAP | SCRAP | SCRAP |

*2-Me refers to 2-mercapto ethanol and DM refers to dodecyl mercaptan.
**The Hegman values were taken prior to filtration and measure grittiness with a value of "0" representing all grit and a value of "8" representing no grit.

305 g/l VOC PAINT PREPARATION EXAMPLES

The following procedure was generally followed for each paint composition below. Charge a vessel with the initial NAD and the mineral spirits charges shown below. Start dispersing and add soya lecithin and titanium dioxide under low speed. Increase to high speed mixing. Run approximately 10 to 15 minutes. Decrease to low speed mixing and add the remaining materials in the order shown below.

EXAMPLE FIVE

The following formula was used to prepare a 305 g/l VOC gloss paint:

| | |
|---|---|
| NAD "A" from Alkyd of Ex. I | 302.33 lbs |
| Mineral Spirits | 24.96 |
| Soya Lecithin | 3.00 |
| Rutile Titanium Dioxide | 190.00 |
| NAD "A" from Alkyd of Ex. I | 305.63 |
| Mineral Spirits | 21.59 |
| 12% Cobalt Catalyst | 1.24 |
| 10% Ca Synthetic Acid Drier | 7.96 |
| Methyl Ethyl Ketoxime | 2.00 |
| Mineral Spirits | 98.36 |

The paint had KU and ICI viscosities at 25 degrees C of 67 and 3.1, respectively.

EXAMPLE SIX

The following formula was used to prepare a 305 g/l VOC gloss paints

| | |
|---|---|
| NAD "A" from Alkyd of Ex. II | 302.33 lbs |
| Mineral Spirits | 24.96 |
| Soya Lecithin | 3.00 |
| Rutile Titanium Dioxide | 190.00 |
| NAD "A" from Alkyd of Ex. II | 282.86 |
| Mineral Spirits | 21.59 |
| 12% Cobalt Catalyst | 1.24 |
| 10% Ca Synthetic Acid Drier | 7.96 |
| Methyl Ethyl Ketoxime | 2.00 |
| Mineral Spirits | 119.38 |

The paint had KU and ICI viscosities at 25 degrees C of 106 and 5+, respectively.

EXAMPLE SEVEN

The following formula was used to prepare a 305 g/l VOC gloss paint:

| | |
|---|---|
| NAD "A" from Alkyd of Ex. III | 305.66 lbs |
| Mineral Spirits | 24.96 |
| Soya Lecithin | 3.00 |
| Rutile Titanium Dioxide | 190.00 |
| NAD "A" from Alkyd of Ex. III | 319.76 |
| Mineral Spirits | 21.59 |
| 12% Cobalt Catalyst | 1.24 |
| 10% Ca Synthetic Acid Drier | 7.96 |
| Methyl Ethyl Ketoxime | 2.00 |
| Mineral Spirits | 93.85 |

The paint had KU and ICI viscosities at 25 degrees C of 62 and 1.3, respectively.

EXAMPLE EIGHT

The following formula was used to prepare a 305 g/l VOC gloss paint:

| | |
|---|---|
| NAD "A" from Alkyd of Ex. IV | 302.33 lbs |
| Mineral Spirits | 24.96 |
| Soya Lecithin | 3.00 |
| Rutile Titanium Dioxide | 190.00 |
| NAD "A" from Alkyd of Ex. IV | 310.71 |
| Mineral Spirits | 21.59 |
| 12% Cobalt Catalyst | 1.24 |
| 10% Ca Synthetic Acid Drier | 7.96 |
| Methyl Ethyl Ketoxime | 2.00 |
| Mineral Spirits | 92.08 |

The paint had KU and ICI viscosities at 25 degrees C of 72 and 4.8, respectively.

EXAMPLE NINE

The following formula was used to prepare a 305 g/l VOC gloss paint:

| | |
|---|---|
| NAD "A" from Cargill 57-5843/DM | 305.66 lbs |
| Mineral Spirits | 24.96 |
| Soya Lecithin | 3.00 |
| Rutile Titanium Dioxide | 190.00 |
| NAD "A" | 303.20 |
| Mineral Spirits | 21.59 |
| 12% Cobalt Catalyst | 1.24 |
| 10% Ca Synthetic Acid Drier | 7.96 |

-continued

|  |  |
|---|---|
| Methyl Ethyl Ketoxime | 2.00 |
| Mineral Spirits | 98.23 |

The paint had KU and ICI viscosities at 25 degrees C of 73 and 3.6, respectively.

EXAMPLE TEN

The following formula was used to prepare a 305 g/l VOC gloss paint:

|  |  |
|---|---|
| NAD "A" from Cargill 57-5843/2-Me | 304.47 lbs |
| Mineral Spirits | 24.96 |
| Soya Lecithin | 3.00 |
| Rutile Titanium Dioxide | 190.00 |
| NAD "A" | 303.20 |
| Mineral Spirits | 21.59 |
| 12% Cobalt Catalyst | 1.24 |
| 10% Ca Synthetic Acid Drier | 7.96 |
| Methyl Ethyl Ketoxime | 2.00 |
| Mineral Spirits | 95.00 |

The paint had KU and ICI viscosities at 25 degrees C of 61 and 1.6, respectively.

EXAMPLE ELEVEN

The following formula was used to prepare a 305 g/l VOC gloss paint:

|  |  |
|---|---|
| NAD "A" (NVM 82.2) McCloskey Alkyd | 305.66 lbs |
| Mineral Spirits | 25.08 |
| Soya Lecithin | 3.00 |
| Rutile Titanium Dioxide | 190.00 |
| NAD "A" | 300.00 |
| Mineral Spirits | 21.59 |
| 12% Cobalt Catalyst | 1.24 |
| 10% Ca Synthetic Acid Drier | 7.96 |
| Methyl Ethyl Ketoxime | 2.00 |
| Mineral Spirits | 93.73 |

The paint had KU and ICI viscosities at 25 degrees C of 65 and 1.5, respectively.

EXAMPLE TWELVE

The following formula was used to prepare a 305 g/l VOC gloss paint:

|  |  |
|---|---|
| NAD "A" (NVM 97.8) McCloskey Alkyd | 308.80 lbs |
| Mineral Spirits | 25.08 |
| Soya Lecithin | 3.00 |
| Rutile Titanium Dioxide | 190.00 |
| NAD "A" | 190.32 |
| Mineral Spirits | 21.59 |
| 12% Cobalt Catalyst | 1.24 |
| 10% Ca Synthetic Acid Drier | 7.96 |
| Methyl Ethyl Ketoxime | 2.00 |
| Mineral Spirits | 190.56 |

The paint had KU and ICI viscosities at 25 degrees C of 61 and 1.2, respectively.

243 g/l VOC PAINT PREPARATION EXAMPLES

EXAMPLE THIRTEEN

The following formula was used to prepare a 243 g/l VOC gloss paint formula:

|  |  |
|---|---|
| NAD "A" from Alkyd of Ex. I | 302.33 lbs |
| Mineral Spirits | 24.96 |
| Soya Lecithin | 3.00 |
| Rutile Titanium Dioxide | 190.00 |
| NAD "A" from Alkyd of Ex. I | 397.24 |
| Mineral Spirits | 21.59 |
| 12% Cobalt Catalyst | 1.44 |
| 10% Ca Synthetic Acid Drier | 9.18 |
| Methyl Ethyl Ketoxime | 2.00 |
| Mineral Spirits | 30.42 |

The paint had KU and ICI viscosities at 25 degrees C of 95 and 5+, respectively.

EXAMPLE FOURTEEN

The following formula was used to prepare a 243 g/l VOC gloss paint formula:

|  |  |
|---|---|
| NAD "A" from Alkyd of Ex. III | 305.66 lbs |
| Mineral Spirits | 24.96 |
| Soya Lecithin | 3.00 |
| Rutile Titanium Dioxide | 190.00 |
| NAD "A" from Alkyd of Ex. III | 414.03 |
| Mineral Spirits | 21.59 |
| 12% Cobalt Catalyst | 1.44 |
| 10% Ca Synthetic Acid Drier | 9.18 |
| Methyl Ethyl Ketoxime | 2.00 |
| Mineral Spirits | 25.21 |

The paint had KU and ICI viscosities at 25 degrees C of 83 and 3.7, respectively.

EXAMPLE FIFTEEN

The following formula was used to prepare a 243 g/l VOC gloss paint formula:

|  |  |
|---|---|
| NAD "A" from Cargill 57-5843/DM | 305.66 lbs |
| Mineral Spirits | 24.96 |
| Soya Lecithin | 3.00 |
| Rutile Titanium Dioxide | 190.00 |
| NAD "A" | 394.91 |
| Mineral Spirits | 21.59 |
| 12% Cobalt Catalyst | 1.44 |
| 10% Ca Synthetic Acid Drier | 9.18 |
| Methyl Ethyl Ketoxime | 2.00 |
| Mineral Spirits | 30.29 |

The paint had KU and ICI viscosities at 25 degrees C of 124 and 5+, respectively.

EXAMPLE SIXTEEN

The following formula was used to prepare a 243 g/l VOC gloss paint formula:

|  |  |
|---|---|
| NAD "A" from Cargill 57-5843/2-Me | 304.47 lbs |
| Mineral Spirits | 24.96 |
| Soya Lecithin | 3.00 |
| Rutile Titanium Dioxide | 190.00 |
| NAD "A" | 394.74 |
| Mineral Spirits | 21.59 |
| 12% Cobalt Catalyst | 1.44 |
| 10% Ca Synthetic Acid Drier | 9.18 |

| | |
|---|---|
| Methyl Ethyl Ketoxime | 2.00 |
| Mineral Spirits | 26.54 |

The paint had KU and ICI viscosities at 25 degrees C of 86 and 5+, respectively.

EXAMPLE SEVENTEEN

The following formula was used to prepare a 243 g/l VOC gloss paint formula:

| | |
|---|---|
| NAD "A" (NVM 82.2) McCloskey Alkyd | 305.66 lbs |
| Mineral Spirits | 24.13 |
| Soya Lecithin | 3.00 |
| Rutile Titanium Dioxide | 190.00 |
| NAD "A" | 391.33 |
| Mineral Spirits | 21.59 |
| 12% Cobalt Catalyst | 1.44 |
| 10% Ca Synthetic Acid Drier | 9.18 |
| Methyl Ethyl Ketoxime | 2.00 |
| Mineral Spirits | 26.04 |

The paint had KU and ICI viscosities at 25 degrees C of 86 and 4.8, respectively.

EXAMPLE EIGHTEEN

The following formula was used to prepare a 243 g/l VOC gloss paint formula:

| | |
|---|---|
| NAD "A" (NVM 97.8) McCloskey Alkyd | 308.80 lbs |
| Mineral Spirits | 25.08 |
| Soya Lecithin | 3.00 |
| Rutile Titanium Dioxide | 190.00 |
| NAD "A" | 265.46 |
| Mineral Spirits | 21.59 |
| 12% Cobalt Catalyst | 1.44 |
| 10% Ca Synthetic Acid Drier | 9.18 |
| Methyl Ethyl Ketoxime | 2.00 |
| Mineral Spirits | 136.59 |

The paint had KU and ICI viscosities at 25 degrees C of 82 and 3.5, respectively.

What is claimed is:

1. A process for producing an air-dry alkyd-stabilized non-aqueous dispersion of addition polymers in an alkyd medium, having a non-volatile materials content greater than about 70% and a volatile organic content less than about 305 grams/liter, comprising:

a) selecting an alkyd having a non-volatile materials content of at least 75% and a z-average molecular weight, Mz, between about 10,000 and about 250,000, and having a polydispersity between about 2.0 and about 20, and b) selecting one or more monomers which are substantially free of acid functionality and predominantly insoluble in the alkyd, wherein at least one monomer has hydroxy-functionality;

c) polymerizing the one or more monomers in the alkyd medium via a free radical addition mechanism in the presence of a mercaptan-containing chain transfer agent.

2. The process of claim 1 wherein the alkyd has a Mz of between about 15,000 and about 150,000 and a polydispersity of between about 2.0 and about 6.0.

3. The process of claim 1 wherein the at least one monomer having hydroxy functionality is between about 5% and 35% by weight of total reactor charge.

4. The process of claim 3 wherein the alkyd has a z-average molecular weight $M_z$, of between about 15,000 and about 150,000 and a polydispersity of between about 2.0 and about 6.0.

5. The process of claim 4 wherein said hydroxy functional monomer is selected from the group consisting of hydroxy ethyl acrylate and hydroxy ethyl methacrylate, and mixtures thereof.

6. The process of claim 5 wherein said monomer charge comprises methyl methacrylate and hydroxy ethyl acrylate.

7. The process of claim 6 wherein said chain transfer agent is selected from the group consisting of methyl mercaptopropionate, dodecyl mercaptan and 2-mercapto ethanol.

8. The product produced according to claim 1.

9. The product produced according to claim 7.

10. The process of claim 1 wherein the monomers is selected from the group consisting of hydroxyethylacrylate and methacrylate, hydroxypropylacrylate and methacrylate, trimethylolproprane triacrylate and trimethacrylate, hexanediol diacrylate, allyl alcohol.

11. The process of claim 1 wherein the monomers that are substantially free of hydroxy-functionality is selected from the group consisting of acrylonitrile, methacrylonitrile, methyl acrylate and methacrylate, ethyl acrylate and methacrylate, butyl acrylate and methacrylate, lauryl acrylate and methacrylate, caprolactone modified acrylate, polyethylene oxide acrylate and methacrylate, polypropylene oxide acrylate and methacrylate, acrylamide, methacrylamide, vinyl chloride, vinylidene chloride, and the like.

12. The process of claim 1 wherein preformed polymers, polymeric intermediates, multifunctional epoxides, melamines and isocyanates, and mixtures thereof is present in addition to the monomers.

* * * * *